United States Patent [19]

Kant et al.

[11] Patent Number: 4,670,804

[45] Date of Patent: Jun. 2, 1987

[54] EXPANDABLE SUSPENSION FOR A READ/WRITE HEAD IN A DISK FILE

[75] Inventors: Rishi Kant, Portola Valley; Dennis R. McEfee, San Jose; Thomas F. Roth, San Jose; Richard K. Wilmer, San Jose, all of Calif.

[73] Assignee: International Business Machines Corporation, Armonk, N.Y.

[21] Appl. No.: 787,281

[22] Filed: Oct. 15, 1985

[51] Int. Cl.⁴ ............................................... G11B 5/60
[52] U.S. Cl. .................................... 360/102; 360/105
[58] Field of Search .................... 360/105, 104, 97–98, 360/109

[56] References Cited

U.S. PATENT DOCUMENTS 3,488,648  1/1970  Church ........................... 360/102 X
3,864,749  2/1975  Stansell ........................... 360/104 X

FOREIGN PATENT DOCUMENTS 153793  1/1985  European Pat. Off. .
214707  10/1984  German Democratic Rep. .
59-104769  6/1984  Japan .

OTHER PUBLICATIONS

"Transducer Mounting", IBM Technical Disclosure Bulletin, vol. 6, No. 8, Jan. 1964, p. 102.

Primary Examiner—A. J. Heinz
Attorney, Agent, or Firm—Thomas R. Berthold

[57] ABSTRACT

A suspension for an air-bearing slider 32 in a data recording disk file is an envelope 30 which expands when pressurized air enters the envelope interior. The envelope 30 includes a pair of flat flexible sheets 50, 52, preferably of polyimide, which are secured at their perimeters 54, and stiffeners 40, 42, 56 bonded to the sheets 50, 52 to provide stiffness between the slider 32 and the arm attached to the disk file actuator. Four parallel strips 60, 62, 63, 64 on the polyimide sheets 50, 52 function as hinges so that the envelope expands in the manner of a four-bar linkage, thus moving the slider 32 toward the disk with the slider's air-bearing surface maintained generally parallel to the data surface of the disk. Electrical conductors 80 for connecting the read/write transducer 33 supported on the slider 32 to the read/write circuitry of the disk file are formed on one of the polyimide sheets 50.

18 Claims, 6 Drawing Figures

EXPANDABLE SUSPENSION FOR A READ/WRITE HEAD IN A DISK FILE

TECHNICAL FIELD

This invention relates to slider-suspension assemblies for data recording disk files, and more particularly to a suspension which both supports the slider and attached transducer to the arm of the head positioning actuator and moves the slider to and away from the surface of the disk during start and stop operations, respectively.

BACKGROUND OF THE INVENTION

Disk files are information storage devices which utilize at least one rotatable disk with concentric data tracks containing the information, a head (or "transducer") for reading data from or writing data to the various tracks, and a head positioning actuator connected to the head for moving it to the desired track and maintaining it over the track centerline during read or write operations. The transducer is attached to an air-bearing slider which is supported adjacent the data surface of the disk by a cushion of air generated by the rotating disk. The slider is connected to a support arm of the head positioning actuator by means of a suspension.

The suspension provides high spring stiffness and dimensional stability between the slider and actuator arm, some flexibility in pitch and roll motion of the slider relative to its direction of motion to the rotating disk, and resistance to yaw motion. In certain disk files the suspension provides a load or force against the slider which is compensated by the force of the air bearing between the slider and the disk, thus maintaining the slider in extremely close proximity to, but out of contact with, the data surface of the disk. Other types of disk files utilize a "negative pressure" or "self-loading" slider, such as is disclosed in U.S. Pat. No. 3,855,625 assigned to the same assignee as this application. It is desirable to maintain the self-loading slider adjacent the data surface of the disk with as low a "loading" force as possible since the slider creates a vacuum between it and the disk which holds the slider adjacent the data surface.

Conventional slider-suspension assemblies have several inherent disadvantages. First, because some load is typically applied to the slider by the suspension in a generally perpendicular direction relative to the data surface of the disk, the slider comes to rest on the data surface of the disk when disk rotation stops and the air bearing disappears. The starting and stopping of the disk with the slider in contact can cause damage to the data surface of the disk and to the slider or attached transducer. If it is desired to maintain the slider away from the disk when the disk is not rotating, it is necessary to use some type of "load/unload" device which mechanically moves the suspension and/or slider away from the disk when disk rotation stops and back to the disk when the disk has reached its operating speed and the air bearing is present to maintain the slider out of contact with the data surface. Secondly, because conventional suspensions are designed to flex in a generally perpendicular direction relative to the data surface of the disk and are thus not generally rigid in that direction, the data surface of the disk and the slider can be damaged if the slider suddenly impacts the disk, such as may occur during shipping of the disk file.

SUMMARY OF THE INVENTION

The invention is a suspension for disk files and comprises a pressurizable envelope having stiffening members for providing stiffness between the slider and the actuator arm generally in the direction of track accessing. An opening is provided in the envelope near the mounting of the suspension to the actuator arm for permitting the entry of gas into the interior. When the envelope is pressurized by the entry of gas the envelope expands, thus moving the attached slider generally perpendicularly toward the disk. When the pressurized gas is removed from the envelope the envelope relaxes and returns to its unexpanded position, thus moving the slider away from the disk. The pressurized gas is available either from an external source or from the air flow generated by the rotating disk.

In the preferred embodiment of the invention, the envelope comprises two generally flat sheets of flexible material bonded together about their perimeters and having stainless steel stiffening members bonded to their outer surfaces. There are gaps between the ends of the stiffening members and the locations where the envelope is mounted to the actuator arm as well as between the ends of the stiffening members and the slider. These gaps define strips of the flexible material on the sheets, the strips being generally parallel to one another. The strips of flexible material, which are portions of the sheets, function as hinges when the envelope expands, thus causing the envelope to expand in the manner of a four-bar linkage. In this manner of expansion, the slider is moved generally perpendicularly toward the disk with its air-bearing surface maintained generally parallel to the data surface of the disk.

The envelope stiffening members provide stiffness between the slider and the actuator arm, which is typically in the same direction as the direction of track accessing, i.e. generally in the radial direction relative to the disk. Because the slider is isolated from the stiffening members by the hinges, the suspension provides excellent flexibility in both pitch and roll motion. Because the sheet on which the slider is attached is not generally flexible in the plane of the sheet in the hinge region, the suspension also provides resistance of the slider to yaw motion and contributes to the high stiffness between the slider and the actuator arm.

Thus the suspension functions both as a conventional suspension in that it provides stiffness in the radial direction, flexibility in pitch and roll motion, and resistance to yaw motion; and as a "load/unload" device in that it automatically moves the slider and attached transducer into read/write engagement with the data surface of the disk when disk rotation is started and away from the disk when disk rotation is stopped. Moreover, in its relaxed or unexpanded position the envelope has essentially zero volume. Thus it is resistant to external flexure due to sudden impact, such as may occur during shipping, because such flexure would tend to create a vacuum within the envelope interior and because the opening into the envelope interior is a relatively small restricted orifice. Accordingly, the suspension alone functions to prevent damage to the slider or disk during shipping or sudden impact to the disk file.

For a fuller understanding of the nature and advantages of the present invention, reference should be made to the following detailed description taken in conjunction with the accompanying drawings.

DESCRIPTION

A. Prior Art

Figure 1:
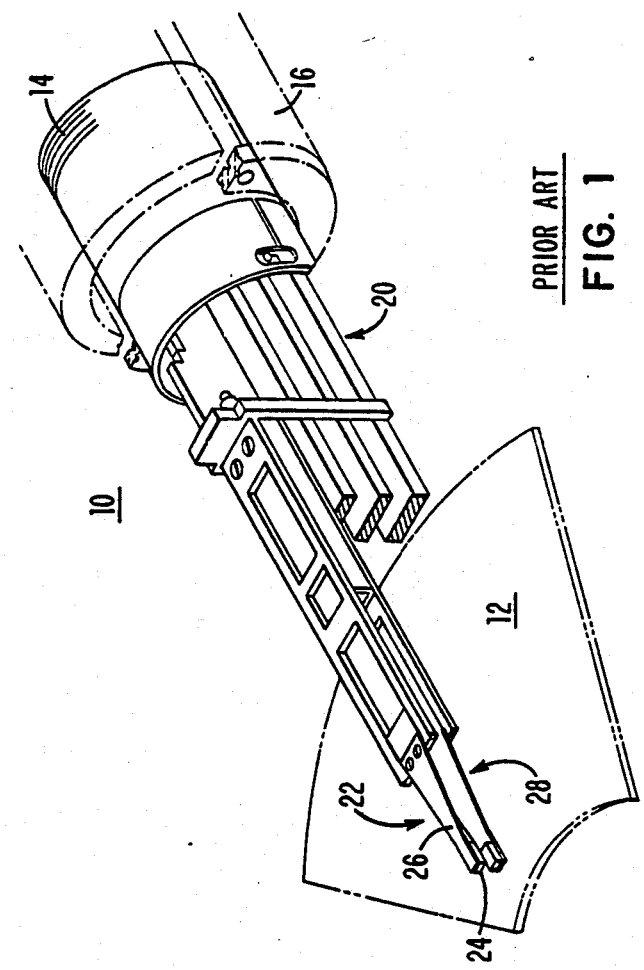
FIG. 1 is an illustration of a conventional slider-suspension assembly mounted to the arm of a voice coil motor (VCM) actuator in a conventional disk file.

Referring first to FIG. 1, there is illustrated a conventional actuator 10 and a segment of an associated disk 12 of a data recording disk file. The actuator 10 includes a voice coil motor, which is a coil 14 movable within the magnetic field of a fixed permanent magnet assembly (not shown) having a core within coil 14 and an outer structure supported by housing 16, and an actuator arm 20 attached to the movable coil 14. Attached to the other end of actuator arm 20 are slider-suspension assemblies, such as typical slider-suspension assembly 22 comprising slider 24 and suspension 26. The slider 24 of slider-suspension assembly 22 supports the read/write transducer (not shown) and has a surface generally parallel to the surface of disk 12 for supporting the transducer above the surface of disk 12 on a bearing or cushion of air generated by the rotation of disk 12. The segment of disk 12 is shown in dashed line in FIG. 1 in order to present the view of an additional slider-suspension assembly 28 associated with the opposite data recording surface of disk 12.

The suspension 26 of slider-suspension assembly 22 provides a load to the slider which is generally perpendicular to the surface of disk 12. This perpendicular load maintains slider 24 in contact with the data surface of disk 12 when disk 12 is not rotating. During rotation of disk 12 the air bearing generated between the slider 24 and disk 12 opposes the perpendicular load applied to the slider 24 by suspension 26.

During operation, the slider 24 is moved to the desired track of the concentric data tracks on the data surface of disk 12 by means of the coil 14 which moves within the magnetic field of the magnet assembly. Because it is desired to provide rapid access of the transducer on slider 24 from one track to another track for read or write operations, it is necessary that the transducer on slider 24 be properly positioned over the desired track and reach that track in a minimum amount of time. This requires that the suspension 26 provide sufficient stiffness and dimensional stability between slider 24 and actuator arm 20. If the resonant frequency of the slider-suspension assembly is too low in the direction of track access, i.e. the direction generally radially relative to the disk and perpendicular to the data tracks, it will not be possible for the head positioning servo control system to allow the actuator to move the transducer to the desired track and maintain the transducer over the centerline of the desired track during read or write operations. It should be noted that while the actuator 10 illustrated in FIG. 1 is a linear actuator which moves the slider in a precisely radial direction perpendicular to the tracks, other types of conventional disk files utilize a rotary actuator which moves the slider in an arcuate path which is only generally in the radial direction.

In addition to providing radial stiffness, the suspension 26 must be attached to the slider 24 in such a manner that the slider 24 has substantial flexibility in pitch and roll directions as it rides on the air bearing above the data surface of disk 12. One type of suspension which provides both a relatively low perpendicular load to the slider and a flexible attachment to the slider is a suspension commonly referred to as the Watrous suspension, which is described in U.S. Pat. No. 4,167,765 assigned to the same assignee as this application.

In a conventional disk file there are additional slider-suspension assemblies which are attached to the actuator arm 20. These slider-suspension assemblies are associated with the data surfaces of additional disks in a stack of disks which make up the disk file. That portion of arm 20 which would otherwise support those additional assemblies has been sectioned off in FIG. 1 to permit the simplified view of the actuator 10, the segment of disk 12 and the slider-suspension assembly 22.

B. Preferred Embodiment

Figure 2:
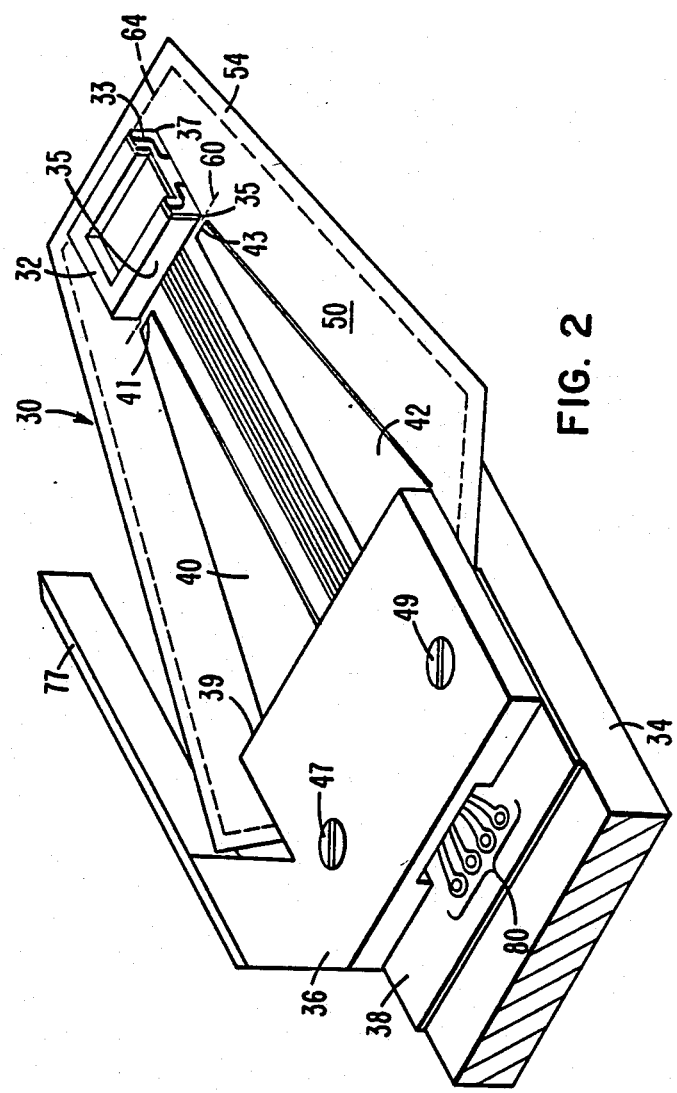
FIG. 2 is a perspective view, in enlarged scale, of a slider-suspension assembly embodying the invention and illustrating the envelope in its relaxed position with the slider attached at one end and the mounting block for attachment to the actuator arm at the other end.

Referring now to FIG. 2, in lieu of the slider-suspension assembly 22 of FIG. 1, the slider-suspension assembly of the present invention comprises an expandable envelope 30 which has a self-loading slider 32 attached at one end and which is secured to an actuator arm 34 at the other end by a suspension mounting means, the mounting means including block 36 and plate 38. The envelope 30 includes stiffening means, such as stiffeners 40, 42, which generally provides stiffness between the slider 32 and actuator arm 34, and an opening for the entry of pressurized gas into the interior.

Figure 3:
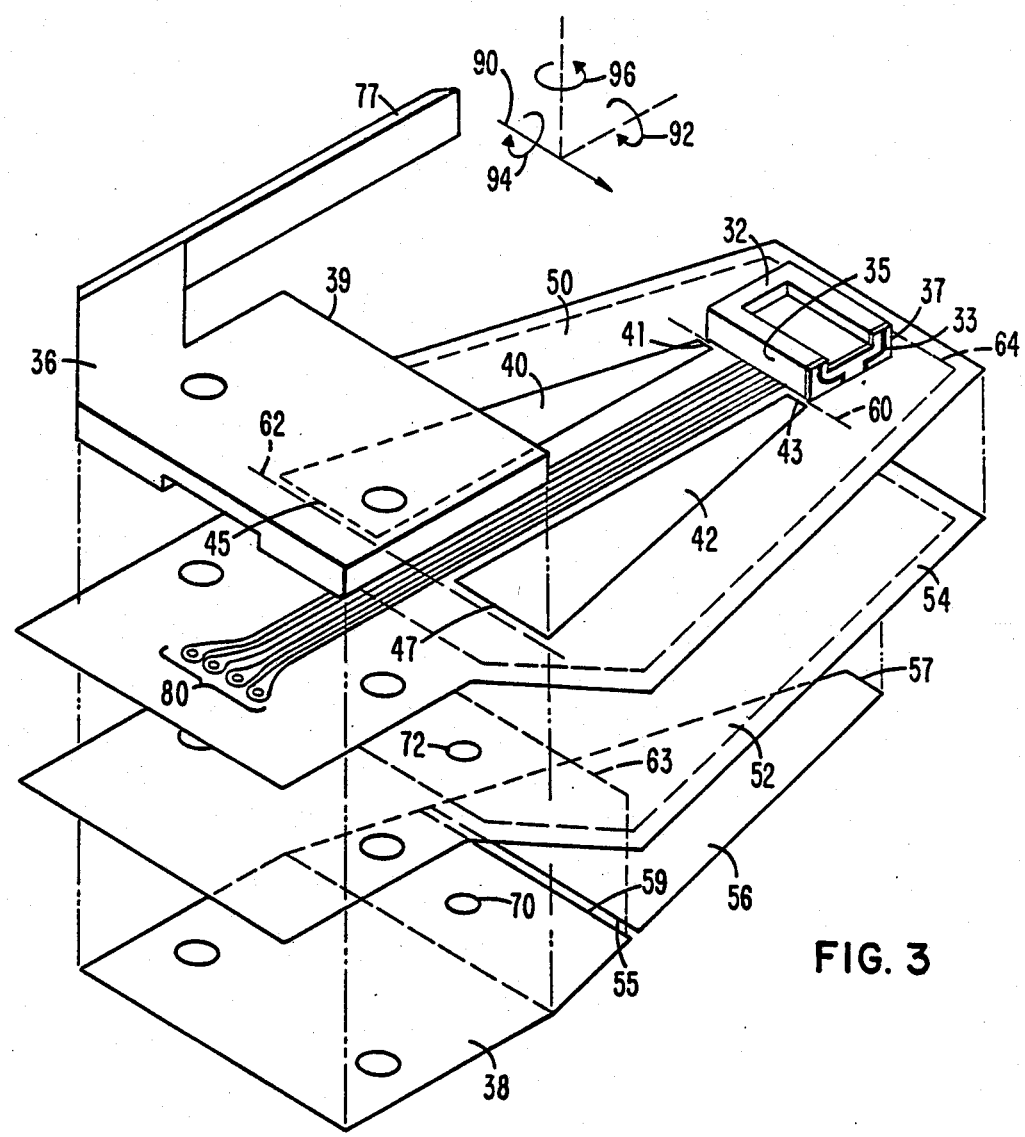
FIG. 3 is an exploded view of the assembly illustrated in FIG. 2 showing the various components making up the slider-suspension assembly.

The construction of the slider-suspension assembly can be better understood by reference to the exploded view of FIG. 3. The envelope 30 includes generally flat flexible sheets 50, 52 and stiffeners 40, 42 and 56. The sheets 50, 52 are secured together about their common perimeter, the secured-together perimeter of the sheets 50, 52 being designated as line 54. The slider 32 has the read/write transducer 33 attached to its rear portion and a generally flat back surface which is secured, as by bonding with epoxy, to the end of sheet 50. The stiffeners 40, 42 are secured to the outer surface of sheet 50, and the stiffener 56 is secured to the outer surface of sheet 52. While two separate stiffeners 40, 42 are used in the preferred embodiment, it is possible to use a single stiffener on the outer surface of sheet 50. Plate 38 is also attached to the outer surface of sheet 52.

The clamping or mounting of the slider-suspension assembly to the actuator arm 34 is accomplished by mounting block 36, by plate 38 which is secured to sheet 52, and by bolts 47, 49 (FIG. 2). In the preferred embodiment the sheets 50, 52 are bonded together about their entire perimeter 54 as well as over their inner surfaces in the region covered by block 36. As shown in FIG. 3, an opening 70 in plate 38 and an opening 72 in sheet 52 permit access to the interior of the envelope for the entry of pressurized gas from outside the slider-suspension assembly.

The sheets 50, 52 may be made of any type of plastic film which has a good flex life. If the sheets are to be in close proximity to soldering of electrical leads to the transducer 33 on the slider 32, the plastic film should also have a high tolerance to heat. In the preferred embodiment the sheets 50, 52 are made of polyimide, such as the Kapton brand of polyimide manufactured by DuPont. The sheets 50, 52 can be bonded about their perimeter 54 by a commercial sheet adhesive, such as adhesive model WA available from DuPont, or a liquid polyimide-based adhesive. The sheet adhesive is placed between the two polyimide sheets 50, 52 in the region of the perimeter 54. The sheets 50, 52 are then pressed together about their perimeter 54 and heated. If a liquid adhesive is used it can be applied in any conventional manner, such as by spraying onto the sheets 50, 52 in the region of perimeter 54.

The stiffeners 40, 42 are bonded to the outer surface of sheet 50 and stiffener 56 is bonded to the outer surface of sheet 52. The mounting plate 38 is also bonded to the outer surface of sheet 52. The stiffeners 40, 42, 56 and the mounting plate 38 are preferably thin members of stainless steel which are bonded to the polyimide sheets 50, 52 in the same manner as previously described for the bonding of the sheets 50, 52 together.

The slider 32, which is typically made of a ceramic material, has its generally flat rectangular back surface bonded to the outer surface of sheet 50 by conventional bonding means, such as epoxy. The end 35 of slider 32 is generally parallel to and slightly spaced from the straight edges 41, 43 of stiffeners 40, 42 respectively. The slight spacing or gap between end 35 of slider 32 and edges 41, 43 of stiffeners 40, 42 defines a strip of the flexible polyimide material, indicated by dashed line 60, which serves as a hinge or flex line when the envelope 30 expands. Similarly, when the mounting block 36 supports the envelope 30 on the actuator arm, the edges 45, 47 of stiffeners 40, 42, respectively, are located generally parallel to and slightly spaced from the end 39 of mounting block 36 so as to define a second strip of flexible material, indicated by dashed line 62, which serves as a hinge. The stiffener 56 bonded to sheet 52 has opposite generally parallel edges 55, 57, the edge 55 being generally parallel to and spaced from the end 59 of mounting plate 38. Edge 57 of stiffener 56 terminates beyond the end 37 of slider 32 opposite slider end 35 so as to generally coincide with that portion of bonded perimeter 54 near slider end 37. The spacing between edge 55 of stiffener 56 and end 59 of plate 38 defines a strip of flexible material, indicated by dashed line 63, which functions as a hinge. Similarly, that portion of bonded perimeter 54 near slider end 37 and edge 57 of stiffener 56 defines a strip of flexible material, indicated by dashed line 64, which also functions as a hinge. Stiffener 56 which is bonded to the outer surface of sheet 52 is generally the same length as stiffeners 40, 42, but is offset from stiffeners 40, 42 when the envelope 30 is in its flat or unexpanded position. This amount of offset generally equals the width of slider 32 plus the spacing between slider end 37 and perimeter 54, which equals the amount the width of mounting plate 38 exceeds that of mounting block 36. The portion of sheet 50 defined by the spacing between slider end 37 and perimeter 54 provides for the necessary roll flexibility of slider 32 when the envelope is expanded and the slider 32 is supported adjacent the data surface by the air bearing.

Since polyimide is used in the preferred embodiment of the suspension, it is possible to deposit, using conventional vapor deposition processes, electrical conductors 80 directly on the polyimide sheet 50 to provide electrical connection between the read/write transducer 33 on slider 32 and the read/write circuitry of the disk file. While not shown in FIG. 3, an additional layer of polyimide may be bonded over the portion of the conductors 80 between the slider 32 and the conductors 80 before the slider is bonded to sheet 50. An opening is provided in the additional polyimide layer in the region of the transducer leads to permit soldering of the transducer leads to the conductors 80. Alternatively, if only one stiffener is used on the outer surface of sheet 50, then the conductors 80 may extend between the stiffener and perimeter 54 into contact with the leads of the transducer 33 on slider 32.

Figure 4:
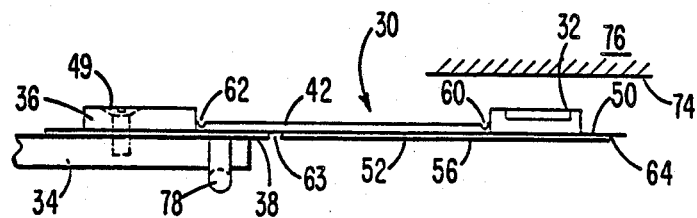
FIG. 4 is an edge view of a portion of a recording disk and the slider-suspension assembly with the envelope in its relaxed or unexpanded position.

The suspension as thus described is shown in its relaxed or unexpanded configuration in the edge view of FIG. 4 with the slider 32 away from the data surface 74 of disk 76. A conduit 78 passes into actuator arm 34 and into communication with openings 70, 72 (FIG. 3) in plate 38 and sheet 52 respectively. In the preferred embodiment the source of pressurized gas through conduit 78 into the interior of the envelope 30 is the pressurized air flow generated by the rotating disk. In this embodiment, the other end (not shown) of conduit 78, i.e. the end not in communication with the envelope interior, is a pitot tube which is aligned with the direction of air flow adjacent the surface of one of the rotating disks in the disk file. Each suspension can have its own associated pitot tube, or one or more pitot tubes on each actuator arm can supply pressurized air to the suspensions supported on the associated arm. Alternatively, the conduit can be connected to an external supply of pressurized gas.

Figure 5:
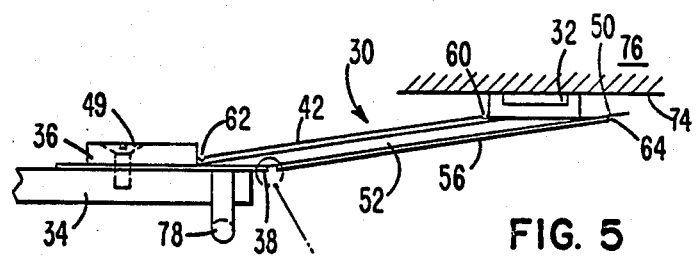
FIG. 5 is an edge view of a portion of a recording disk and the slider-suspension assembly with the envelope in its pressurized or expanded position and the slider in read/write engagement with the data surface of the disk.
Figure 6:
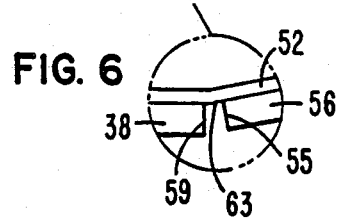
FIG. 6 is an expanded view of a portion of FIG. 5 illustrating the strip of flexible material between the actuator arm mount and one of the stiffening members.

The above described slider-suspension assembly can be better understood by considering the function of the various component parts during operation of the disk file. Before start-up of the disk file the disk 76 is not rotating and the suspension is generally in the configuration shown in FIG. 4 with the slider 32 out of engagement with the data surface 74. When the disk file is first turned on and disk rotation begins, the air flow generated by the rotating disk passes through the pitot tube (not shown) and into conduit 78 and the interior of envelope 30, thus increasing the gas pressure within the interior of the envelope 30. As the disk rotation increases, the interior pressure increases and the envelope expands. In the unexpanded position (FIG. 4), the sheets 50, 52 are generally in contact throughout their entire interior surfaces, and envelope 30 has substantially no internal volume. When a pressurized gas enters through conduit 78 and openings 70, 72 into the interior of envelope 30, the envelope expands to the position depicted in FIG. 5. Because the strips 60, 62, 63, and 64 (which are portions of the sheets 50, 52) function as hinges, the envelope expands generally in the form of a four-bar linkage, as illustrated in FIG. 5. FIG. 6 depicts an expanded view of the strip 63 between plate 38 and stiffener 56. The four-bar linkage form of expansion, i.e. from the relaxed position of FIG. 4 to the expanded position of FIG. 5, moves the slider generally perpendicularly relative to the data surface 74 with the air bearing surface of slider 32 being maintained generally parallel to the data surface 74 during the movement. Because the air bearing surface of slider 32 is moved into read/write engagement with the disk 76 in this manner, there is less likelihood of any damage to the slider 32 or data surface 74 in the event of inadvertent contact between the rotating disk 76 and the slider 32.

As shown in FIG. 3 the direction of disk rotation is generally as indicated by arrow 90. The leading edge of the bonded sheets 50, 52 is formed so as to be swept or angled relative to this direction so as to provide a swept planform to the air flow. This swept planform of bonded sheets 50, 52 improves the air flow past the envelope and minimizes flutter of the envelope. In addition to or instead of the swept planform, an air dam 77 (FIG. 2) may be attached to mount block 36 to deflect the air flow past the leading edge of the envelope 30.

Because the slider 32 is attached to the flexible sheet 50 near its end, the slider 32 has sufficient pitch and roll flexibility to allow it to ride the air bearing adjacent the disk. The portion of sheet 50 between end 37 of slider 32 and end 57 of stiffener 56 is substantially wider than strips 60, 62 or 63 and provides for the necessary roll flexibility of slider 32 when the envelope 30 is expanded. As shown in FIG. 3 the disk rotates past slider 32 in the direction indicated by arrow 90; pitch of the slider being indicated by arrow 92 and roll by arrow 94. However, it should be apparent from FIG. 3 that, because of the close spacing of slider 32 to the ends 41, 43 of stiffeners 40, 42 and because of the general inflexibility of sheet 50 within its own plane in the region where the slider is attached, the slider 32 possesses the desired resistance to yaw motion, i.e. motion in the direction indicated by arrow 96.

The strips of flexible material 60, 62, which are essentially portions of the flexible material defined by the gaps between the mounting block 36, the stiffeners 40, 42 and the slider 32, are of sufficiently minimal thickness that the slider-suspension assembly possesses excellent stiffness in the radial direction. The slider-suspension assembly thus has a relatively high resonant frequency well outside the bandwidth of the head positioning servo control system. This allows the actuator to position the slider so as to accurately access different tracks and remain on the centerline of the desired track.

When the disk file is turned off, disk rotation slows, the gas pressure within the envelope reduces and the envelope ultimately returns to its unexpanded position (FIG. 4). Thus the slider 32 is disengaged from the data surface 74 without having been in contact with the data surface, thereby eliminating the problem associated with contact of the slider and the disk. When the air pressure is reduced within the interior of the envelope, the elastic strain energy in the polyimide hinges (strips 60, 62, 63, 64) and the portions of the sheets 50, 52 generally between the stiffeners and the perimeter, which have been flexed by the expansion of the envelope, causes the envelope to return to the unexpanded configuration shown in FIG. 4.

The amount of "load" force applied perpendicularly to the slider by the expanded envelope is a function of, among other things, the interior gas pressure and the thickness of the polyimide sheets. When the suspension is used with a self-loading slider, the air flow from one of the rotating disks in the disk file generates sufficient pressure to move the slider with minimal force close enough to the disk so that the self-loading action can take place. This pressure is generally in the range of 1 to 3 inches of water above atmospheric and causes the slider to be "loaded" with a force of approximately 1 gram. Once the self-loading slider has been "loaded", the force holding the slider adjacent the data surface is approximately 20 times that of the "loading" force generated by the envelope 30.

In the preferred utilization of the suspension in the disk file, the disks are rotated about an axis in the horizontal plane. In such an orientation, gravity has minimal effect upon the expansion of the envelope. However, if the disk file is oriented so that the disks rotate about a vertical axis, the suspensions located on the bottom surfaces of the disks must overcome the gravitational force when the sliders are "loaded". In such a situation a greater internal pressure may have to be applied to those suspensions. In addition, an external return spring may be required between the mounting means and those suspensions associated with the top surfaces of the disks to facilitate the "unloading" of those sliders.

It should be apparent, by reference to FIG. 4, that when the disks are not rotating the sheets 50, 52 are in close contact and there is substantially no internal volume to the envelope 30. In this position, the envelope is resistant to any sudden external movement, since such movement would tend to create a vacuum within the envelope interior and since the opening into the envelope interior is a relatively small restricted orifice. Thus, the suspension alone is sufficient to prevent accidental impact of the slider with the disk, such as may occur during shipping.

While the preferred embodiment of the present invention has been illustrated in detail, it should be apparent that modifications and adaptations to that embodiment may occur to one skilled in the art. For example, even though the invention has been described with respect to a magnetic recording disk file, it is capable of implementation in optical recording disk files, the primary difference being that the envelope of the present invention would support an optical sensing head instead of the slider-transducer assembly described herein. The suspension which has been described utilizes a four-bar linkage concept as the envelope expansion technique; however various other slider-suspension arrangements are possible, such as placement of the slider near the midpoint of the envelope rather than near the end, which will still cause the slider to move generally perpendicularly toward the disk when the envelope expands. In addition, while the preferred embodiment of the suspension has been described and illustrated with a self-loading slider, the basic concept of the suspension is capable of utilization with a slider requiring a loading force. It should be noted, however, that modifications and adaptations to the invention, such as the examples just described, can be made without departing from the scope of the invention, which is set forth in the following claims.

What is claimed is:

1. A suspension for use in a data recording disk file of the type having at least one disk with a data surface of concentric data tracks, means for rotating the disk about an axis generally perpendicular to the disk, a transducer for writing data to or reading data from the data tracks, the transducer being attached to a slider maintained adjacent the data surface on a cushion of air generated by the rotating disk, means for actuating the slider generally radially relative to the disk so as to permit the transducer to access the data tracks, a support arm attached to the slider actuating means, and a suspension connecting the support arm to the slider, the suspension comprising:
 a pressurizable envelope comprising a pair of flexible sheets sealed together generally at their perimeters and connected to the support arm so as to be generally parallel to the data surface of the disk, at least one of the sheets having a location thereon for attachment of the slider and at least one of the sheets having an opening therein to permit the envelope to be pressurized, and means permanently secured to at least one of the sheets for providing stiffness between the slider and the support arm, whereby when the envelope is pressurized portions of the sealed sheets move apart and the slider is moved generally perpendicularly relative to the disk.

2. The suspension according to claim 1 further comprising a second stiffness means permanently secured to the other of said sheets, both of the stiffness means being of substantially the same length and having first ends proximate the support arm and second ends proximate the slider, and wherein portions of the flexible sheets adjacent both ends of both stiffness means form hinges, thereby allowing the envelope to expand and relax as a four-bar linkage.

3. The suspension according to claim 1 including electrical conductors deposited onto at least one of the flexible sheets and connected to the transducer.

4. The suspension according to claim 1 wherein the flexible sheets are polyimide.

5. The suspension according to claim 1 wherein the stiffness means is formed of stainless steel.

6. A transducer-slider-suspension assembly for use in a data recording disk file of the type having at least one rotatable disk with a data surface of concentric data tracks and an actuator having an arm for supporting and moving the transducer generally radially relative to the disk so as to read data from or write data to the data tracks during rotation of the disk, the transducer-slider-suspension assembly comprising:
 a pressurizable envvelope having a first end attached to the arm, a second end spaced from the first end, and an opening for entry of a pressurized gas;
 a slider with attached transducer connected to the envelope proximate the second end, the envelope further comprising means generally between the arm and the slider for providing stiffness between the arm and the slider;
 means for mounting the envelope to the arm, a portion of the envelope mounting means forming, together with the stiffness means and the slider, a four-bar linkage; and
 means communicating with the envelope opening for dellivering pressurized gas into the envelope interior, whereby the slider is maintained generally parallel to the data surface of the disk during movement toward the data surface when the envelope expands as a four-bar linkage.

7. The assembly according to claim 6 wherein the gas delivering means includes means for receiving the flowing air generated by the rotating disk.

8. The assembly according to claim 6 including electrical conductors formed on the envelope and connected to the transducer.

9. The assembly according to claim 6 wherein the envelope comrpises two generally flat flexible sheets of polyimide bonded together generally at their perimeters, and wherein the stiffness means comprises a rigid member bonded to each sheet and covering only a portion of the surface area of each said sheet.

10. The assembly according to claim 9 wherein the rigid members are generally flat members of stainless steel.

11. The assembly according to claim 9 wherein the sheets are oriented generally parallel to the data surface of the disk and wherein the edge of the sheets adjacent the air flow from the rotating disk is oriented other than perpendicular to the air flow.

12. The assembly according to claim 9 further comprising means attached to the arm for blocking the flow of air past the bonded-together sheets.

13. A slider-suspension assembly for use in a data recording disk file of the type having at least one rotatable disk with a data surface of concentric data tracks, a transducer for reading from or writing to the tracks, an actuator including a support arm for moving the transducer generally radially relative to the disk so as to permit the transducer to access the data tracks, the slider-suspension assembly comprising:
 a first generally flat sheet of flexible material;
 a first rigid member secured to the first sheet, the perimeter of the first rigid member including two generally parallel spaced-apart generally straight edges;
 a slider for supporting the transducer, the slider having an air-bearing surface for a cushion of air generated by the rotating disk and an opposite generally rectangularly shaped back surface with parallel ends, the back surface being secured to the first sheet with a first end of the back surface adjacent, generally parallel to and slightly spaced from the first straight edge of the first rigid member;
 a second generally flat sheet of flexible material having its perimeter secured to the perimeter of the first sheet on the side of the first sheet opposite that to which the first rigid member is secured, a portion of the secured perimeter of the two sheets forming a straight edge adjacent, generally parallel to and spaced from the second end of the back surface of the slider;
 a second rigid member of generally the same length as the first rigid member and secured to the second sheet, the second rigid member having two generally parallel spaced-apart generally straight edges, the second rigid member being secured to the second sheet with the first straight edge of the second rigid member being generally adjacent said straight edge portion of the perimeter of the two secured sheets, the two secured sheets with attached slider and respective rigid members being attached to the actuator arm; and
 means proximate the attachment of the sheets to the arm for the entry of gas into the interior of the secured sheets, whereby when gas enters the interior of the secured sheets, the sheets flex and the slider is moved toward the data surface of the disk.

14. The slider-suspension assembly according to claim 13 wherein the gas entry means further comprises means for receiving the pressurized flowing air generated by the rotating disk.

15. The slider-suspension assembly according to claim 13 including electrical conductors formed onto at least one of said sheets and connected to the transducer supported by the slider.

16. The slider-suspension assembly according to claim 13 wherein the flexible sheets are polyimide.

17. The slider-suspension assembly according to claim 13 further comprising means for mounting the secured sheets to the actuator arm.

18. The slider-suspension assembly according to claim 17 wherein the mounting means is located adjacent to and slightly spaced from the second straight edge of the first rigid member and the second straight edge of the second rigid member, whereby said straight edge portion of the perimeter of the two secured sheets, the portions of the flexible material between the mounting means and the second straight edges of the rigid members, and the portion of flexible material on the first sheet between the first end of the back surface of the slider and the first straight edge of the first rigid member together form four generally parallel hinges which thereby allow the secured sheets with attached slider and rigid members to expand and relax generally as a four-bar linkage.

* * * * *